Jan. 6, 1970  F. A. CARBONE  3,488,468
WELDING NOZZLE LOCKING MECHANISM
Filed June 24, 1966  2 Sheets-Sheet 1
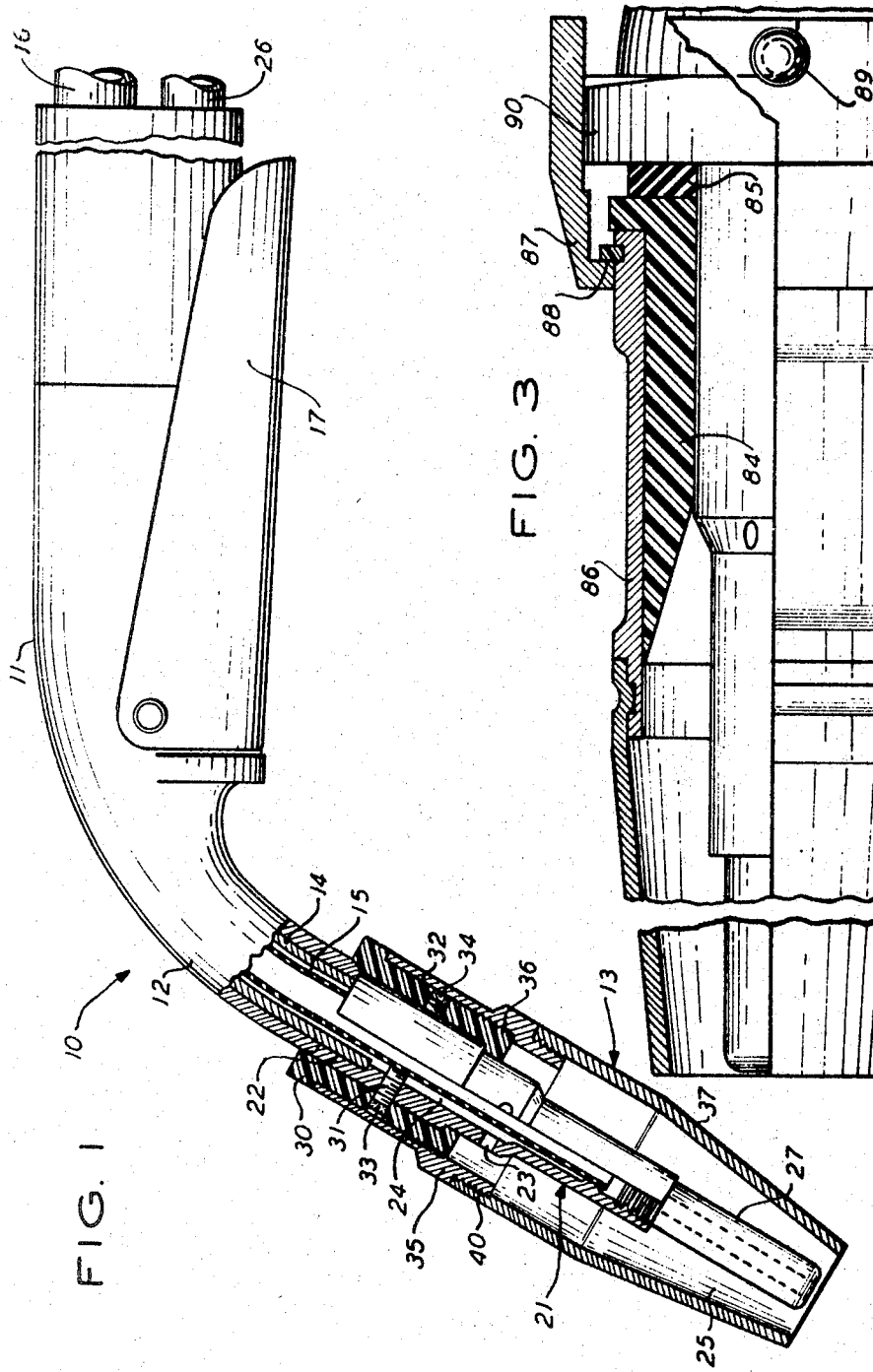
INVENTOR
FRANK A. CARBONE
Francis B. Henry
BY ATTORNEY

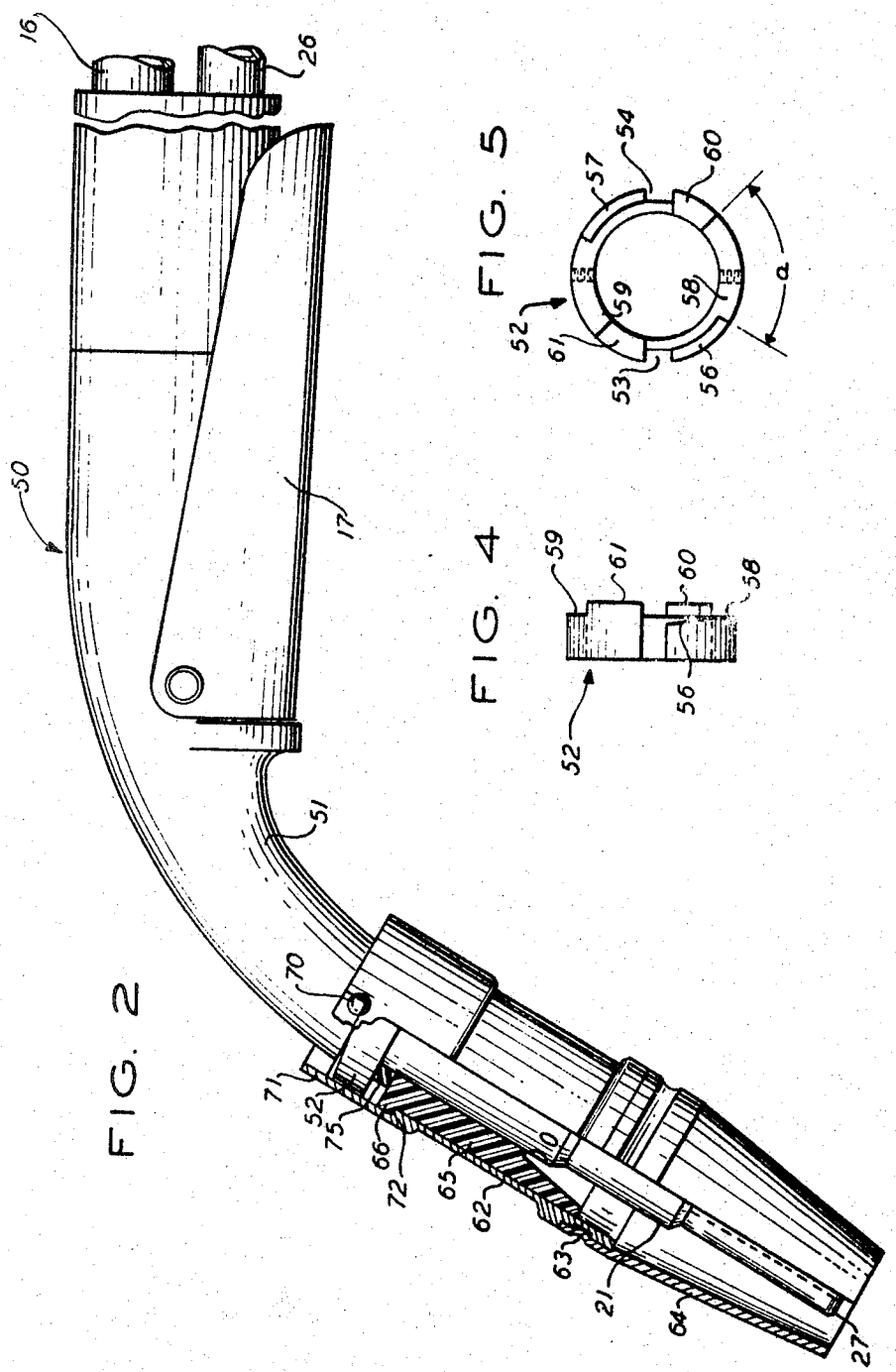

United States Patent Office 3,488,468
Patented Jan. 6, 1970

3,488,468
WELDING NOZZLE LOCKING MECHANISM
Frank A. Carbone, Cranford, N.J., assignor to Air Reduction Company, Incorporated, New York, N.Y., a corporation of New York
Filed June 24, 1966, Ser. No. 560,326
Int. Cl. B23k 9/00
U.S. Cl. 219—136        5 Claims

ABSTRACT OF THE DISCLOSURE

A locking mechanism for welding apparatus wherein the nozzle and body elements are securely, operatively interfitted by the interaction of a cam surface, projection, stop means and resilient means on relative rotation of the nozzle and body elements.

---

This invention relates to an improved nozzle construction for use in apparatus generating an electric arc for welding or cutting purposes.

In the conventional arrangement the metal-inert-gas welding gun has a chrome-plated copper nozzle which is attached to the body of the gun by means of a relatively complicated and troublesome coupling. The coupling usually involves threaded members and this presents several drawbacks. Operators usually wear gloves and are encumbered with masks and heavy clothing. Unscrewing the nozzle from the gun is therefore a time consuming and unpleasant operation. The threads must be fine due to the fact that the gun and nozzle are roughly handled. If coarse threads were used, the nozzle might work itself loose. The threads are machined in the copper nozzle and are susceptible to cross threading and being damaged when the nozzle is removed and replaced. In the conventional form of coupling the above mentioned copper nozzle is threaded on an insulator member which is in turn either threaded or coupled to the body of the gun by means of set screws. The insulator is often fabricated from a fibre-like material and, therefore, cross threading and general thread deterioration is a problem.

A detailed description of a prior art form of device will be given below in order to more clearly illustrate the problems encountered and overcome by the newly designed nozzle construction.

The major drawback, however, associated with a threaded nozzle is the fact that the spatter which is emitted from the welding process often joins the nozzle and the body of the gun so that nozzle removal is impossible. Quite often this occurs after only a relatively short period of continuous or intermittent operation. The operator cannot thereafter remove the nozzle to inspect and clean the contact tube. This often results in the whole piece of welding equipment being decommissioned for repair.

An object of this invention is to alleviate the above noted defects by substituting a novel coupling arrangement for the screwed connection.

Another object of the invention is to provide a quick coupling between the nozzle and gun so that the nozzle may be removed by a slight turn.

Another object of the invention is to provide a resilient connection between the nozzle and gun.

A further object is to provide a novel means for coupling in one operation the nozzle, insulator, and gun body in such a manner that spatter will not prevent the mechanism from being disassembled.

These and other objects of this invention will become apparent from the following description when taken in connection with the drawings, in which:

FIGURE 1 is a view, partly in section, partly broken away, of a conventional connection between the nozzle and gun body;

FIGURE 2 is a view, partly in section, partly broken away, of an embodiment of the invention, mounted on a welding gun;

FIGURE 3 is a view, partly in section, partly broken away, of another embodiment of the invention;

FIGURE 4 is an end view of a locking ring; and

FIGURE 5 is a plan view of the device shown in FIGURE 4.

In FIGURE 1 there is illustrated a prior art form of nozzle assembly mounted on a welding gun 10. The gun has a handle portion 11, neck portion 12 and a nozzle portion 13. The handle and forwardly protruding neck portion may be made of any suitable material, such as a fibre glass compound, etc. Extending through the neck is a copper sleeve 14 which guides the conventional flexible conduit 15. Welding electrode in the form of an elongated wire is fed through the conduit 16 into the handle and down the flexible conduit 15. The hand operated switch 17 controls the flow of wire, shielding gas, and also the electrical power supply. The details of these controls will not be further described in that they are conventional and form no part of this invention.

A copper gas tube 21 is fixed to the elongated copper sleeve 14 by means of brazing 22. This tube has gas ports 23 which serve to conduct the shielding gas from the annular opening 24 surrounding the flexible conduit 15 to the area 25 surrounding the contact tip. This shielding gas is supplied by conduit 26 and is transmitted through the handle around the flexible conduit. The contact tip 27 is threaded in the lower end of the gas tube 21 and serves as the ultimate guide for the wire electrode and also transmits welding current to said electrode. An annular insulating ring 30 surrounds a portion of the gas tube 21 and is affixed thereto by means of set screws 31, 32. As shown, the set screws abut against the flexible conduit 15. Insulating discs 33, 34 are then placed over the set screws to insure there is no electrical connection between the electrode and nozzle. An annular stainless steel nozzle adapter 35 fits over the insulating ring and is threaded 36 thereto. The copper nozzle 37 is threaded on the forward portion of adapter 35. The copper nozzle is chrome plated to resist spatter build up.

Viewing FIGURE 1, it is observed that the forward portion of the nozzle 37 lies in close proximity to the contact tip 27. The weld arc occurs immediately adjacent the front edge of the contact tip and, therefore, the contact tip and nozzle are subjected to high temperatures and are often bespattered with molten metal droplets. After a period of operation the spatter builds up in the inside of the copper nozzle and must be cleaned out. Spatter will also be deposited on the contact tip and this also must be periodically cleaned. If spatter build up is not prevented it is possible that the copper nozzle will be electrically connected with the contact tip and thus become electrically alive. This is a most dangerous condition and must be avoided. The spatter is quite often transmitted into the interior recesses of the nozzle and collects adjacent the threaded portions 40, 36. When the spatter bonds the nozzle 37 to the ring 35 it is then necessary to remove them as a unit to clean the nozzle and contact tip. This is not desirable since the threads on the insulating member 30 are fragile and are susceptible to cross threading, and galling by the spatter.

As mentioned above, quite often the threads 36 are rendered inoperative due to spatter and therefore the nozzle 37, ring 35 and member 30 are rigidly connected together. When an attempt is then made to remove the nozzle the torque is transmitted to the set screws 31, 32 which then shear or fracture the insulating discs 33, 34 and often the insulating ring 30. When this happens the nozzle assembly must be completely disassembled and repaired.

The nozzle must also be removed when "burnback" occurs. This term is used to describe an arc which appears to climb up the wire electrode and fuzes the front face of the contact tip with the electrode. Burnback usually occurs when the wire electrode is not fed at the proper speed or stopped completely. When this occurs the contact tip must be replaced and this would require nozzle removal.

It is therefore apparent that the prior art nozzle construction has numerous drawbacks. The inventive embodiments which will now be described have been devised to alleviate these drawbacks and to provide a more simplified nozzle construction.

In FIGURE 2 there is illustrated an embodiment of the present invention mounted on a conventional welding gun 50. The body of the gun may be molded in one piece of a fibre glass compound or of any other suitable substance. On the forward end of the neck portion 51 there is mounted an annular locking ring 52. This ring may be fabricated of metal and fixed to the neck in any suitable manner (set screws) or it may be a molded part of the torch body. A detailed view of the locking ring 52 is shown in FIGURES 4 and 5. The ring has a pair of longitudinal slots 53, 54 which are adapted to accept pins. Immediately adjacent the slots are cam surfaces 56, 57 which are machined at an angle of approximately 5° as shown in FIGURE 4. Planar surfaces 58, 59 which lie in a plane normal to the axis of the ring lie adjacent to the upper ends of the cam surfaces. Axially projecting stop members 60, 61 lie between the planar surfaces and the slots. If the ring 52 is molded, it is desirable to use metal clips to cover the cam surfaces to provide better wear capability. The structure of the gas tube 21, contact tip 27, flexible conduit 15, etc. is essentially the same as that shown in FIGURE 1 and will not be described in detail. These last mentioned structures taken with the locking ring may be described as the electrode positioning means.

The nozzle structure which is designed to adapt itself to the above described locking ring will now be described. As before, the main parts of the nozzle are the copper nozzle, stainless steel adapter and the insulating ring. These parts have been however coupled together in a unique and simplified manner. The adapter 62 is formed with a circumferential groove 63 as shown in FIGURE 2. The copper nozzle 64 is then slipped on the forward end of the adapter and the parts are crimped together. The upper end of the adapter comprises a cylinder or collar 71 having an internal annular flange 72. Slidably mounted within the adapter is an annular insulating ring 65 having an end flange 66 which is adapted to rest against flange 72. A pair of diametrically opposed locking pins 70 are rigidly mounted in the cylinder or collar 71 and are adapted to slide into the slots 53, 54 in the locking ring. The pins may be in the form of rivets or staples. Positioned around the gas tube 21 is an annular resilient gas seal 75 which lies between the locking ring 52 and the insulator 65. The gas seal 75 serves to prevent the escape of shielding gas and to resiliently lock the nozzle to the gun in the manner now to be described.

In order to mount the nozzle on the gun the pins 70 must be aligned with and then inserted in the slots 53, 54. The nozzle is then angularly turned about its longitudinal axis and the pins forced up the ramps 56, 57. The nozzle may then be rotated until the pins engage the stops 60, 61. The inherent resiliency of the gas seal 75, which is compressed when the pins are forced up the ramps, causes the opposing axial forces which lock the nozzle to the gun. The nozzle therefore is in a position fixed with respect to the gun. The parts may be uncoupled by merely rotating the nozzle in the opposite direction until the pins are alinged with the slots and then shifting the nozzle axially relative to the gun.

The insulator 65 is normally assembled as part of the nozzle. The flange 66 has diametrically opposed slots (not shown) similar to those in the locking ring, so that the insulating member may be inserted in the ring 62 after the pins 70 have been installed.

The ease with which the newly designed nozzle may be coupled and uncoupled to the gun is readily apparent. Even an operator encumbered with gloves, heavy clothing and a face mask has no problem in rotating the nozzle a third of a turn to effect disassembly of the nozzle and gun.

The newly designed nozzle has no threaded parts and no set screws. The portion of the nozzle which is actually used to connect the nozzle and gun is remote from the weld area and therefore has virtually no chance to accumulate spatter. This is a most important feature in that the spatter problem causes much difficulty.

The illustration in FIGURE 3 depicts a further embodiment. The insulator ring 84 and the resilient seal 85 are positioned in the same manner as shown in FIGURE 2. The pins 89 are, however, mounted on a collar 87 which is rotatably mounted with respect to the adapter 86 but limited as to axial movement by locking ring 88. The collar and nozzle are coupled to the annular locking ring 90 in the same manner as described above in the instructions concerning FIGURE 2.

While in the preferred embodiment, a pair of pins and associated cams are utilized, it is obvious that one or more pins and cams could be utilized. This would depend on the size of the nozzle and also cost considerations.

In another embodiment of the invention the relative positions of the cams and pins may be reversed from the positions described above. That is, the cams may be located on the nozzle or collar and the pins may be located on the gun.

The newly designed nozzle has been described in connection with a welding apparatus utilizing a consumable electrode. It is, of course, not limited thereto but could be used with a system employing non-consumable electrodes. The nozzle coupling may also be used in cutting instruments, such as plasma torches, etc.

The use of the nozzle coupling is not limited to a hand held welding or cutting gun but may be used with automated equipment.

The reference to specific materials (copper nozzle, etc.) in the above description is not intended to restrict the disclosure. Any suitable materials may be substituted for those disclosed.

While I have disclosed my invention in terms of particular embodiment thereof, I do not thereby intend any unnecessary limitations. Modifications in many respects will be suggested by my disclosure to those skilled in the art, and such modifications will not necessarily constitute a departure from the spirit of the invention or from its scope, which I undertake to define in the following claims.

I claim:

1. An apparatus for generating an electric arc comprising an electrode positioning means, nozzle means rotatably telescopingly fitted over a part of said electrode positioning means, a cam surface located on one of said means positioned to cause axial movement of an interacting cam follower relative to said positioning means, a cam surface engaging projection located on the other of said means and adapted to interact with said cam surface, and resilient means operatively located between said nozzle means and a part of said electrode positioning means so that rotation of said nozzle means relative to said positioning means causes axial movement of said nozzle means with respect to said positioning means to thereby cause compression of said resilient means in detachably securing the nozzle means to the positioning means.

2. The device as described in claim 1 wherein said nozzle means comprises an annular insulating ring surrounding the electrode and located adjacent said resilient means.

3. The device as described in claim 1 wherein said electrode positioning means comprises an annular member surrounding the electrode, said cam surface being located on said annular member.

4. The device as described in claim 3 wherein said nozzle means comprises an adapter, said projection being mounted on said adapter.

5. An apparatus for generating an electric arc comprising an electrode positioning member, a nozzle member and a coupling mechanism for releasably joining the members in an essentially coaxial and telescoping relationship, said electrode positioning member having an annular locking ring fixedly mounted thereon, said locking ring having a cam surface formed on one surface thereof adapted to cause axial movement of an interacting cam follower relative to said electrode positioning member, the nozzle member comprising a pair of annular members, one telescopingly fitted in the other, a cam surface engaging projection mounted on said nozzle member and adapted to interact with said cam surface, a resilient means operatively located between said locking ring and one of said pair of annular members whereby rotation of said nozzle member relative to said electrode positioning member causes axial displacement of said nozzle member with respect to said electrode positioning member to forceably engage said projection with said cam surface during the coupling of said members.

References Cited

UNITED STATES PATENTS

| 454,287 | 6/1891 | McElroy | 285—394 X |
| 604,596 | 5/1898 | Berger et al. | 285—394 X |
| 3,047,715 | 7/1962 | Pilia | 219—127 |
| 3,048,691 | 8/1962 | Longstreth | 219—130 |
| 3,128,370 | 4/1964 | Meyer | 219—130 |

JOSEPH V. TRUHE, Primary Examiner

J. G. SMITH, Assistant Examiner

U.S. Cl. X.R.

219—130